United States Patent [19]
Ishida

[11] Patent Number: 4,938,590
[45] Date of Patent: Jul. 3, 1990

[54] LIQUID LEVEL INDICATOR USING LASER BEAM

[75] Inventor: Sadao Ishida, Urawa, Japan

[73] Assignees: Nitto Machinery Co., Ltd., Tokyo; Tadahiko Kuno, Kanagawa, both of Japan

[21] Appl. No.: 230,552

[22] Filed: Aug. 10, 1988

[30] Foreign Application Priority Data

Aug. 13, 1987 [JP] Japan .................. 62-202173

[51] Int. Cl.$^5$ .................. G01C 3/08; G01F 23/00; G01F 23/30
[52] U.S. Cl. .................. 356/5; 356/4; 73/1 H; 73/293; 73/305; 73/306
[58] Field of Search .................. 356/4, 5, 20; 73/1 H, 73/293, 305, 306

[56] References Cited

U.S. PATENT DOCUMENTS

| | | | |
|---|---|---|---|
| 4,037,161 | 7/1977 | Westell | 356/5 X |
| 4,269,506 | 5/1981 | Johnson et al. | 356/5 |
| 4,732,035 | 3/1988 | Lagergren et al. | 73/49.2 |
| 4,770,526 | 9/1988 | Manhart et al. | 356/5 |

FOREIGN PATENT DOCUMENTS

| | | |
|---|---|---|
| 0102102 | 3/1984 | European Pat. Off. . |
| 0189339 | 7/1986 | European Pat. Off. . |
| 2235329 | 2/1974 | Fed. Rep. of Germany . |
| 2630789 | 1/1978 | Fed. Rep. of Germany . |
| WO83/03135 | 9/1983 | PCT Int'l Appl. . |

Primary Examiner—Thomas H. Tarcza
Assistant Examiner—Linda J. Wallace
Attorney, Agent, or Firm—Wegner & Bretschneider

[57] ABSTRACT

A fiber optic liquid level indicator with a floating reflector includes a reference scale provided with a reflector disposed in an upper space above the liquid level within a pressure vessel so that a reference distance usable to correct error due to pressure can be calculated on the basis of travel time of a laser beam pulse emitted from a laser generator and reflected from the reference scale reflector through an optical guide and lens. A beam change-over switch is used to selectively guide a laser beam pulse to either the floating reflector or to the reference scale reflector so that pulse travel time can be determined.

7 Claims, 3 Drawing Sheets

LIQUID LEVEL
INDICATOR

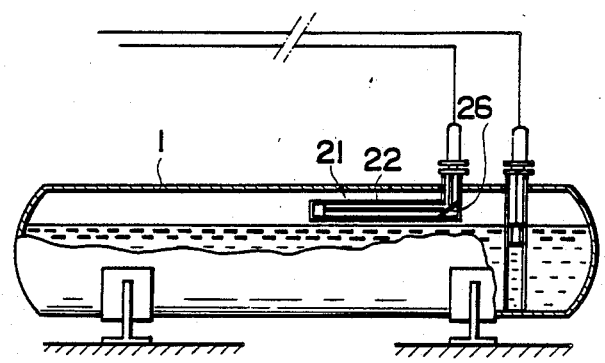
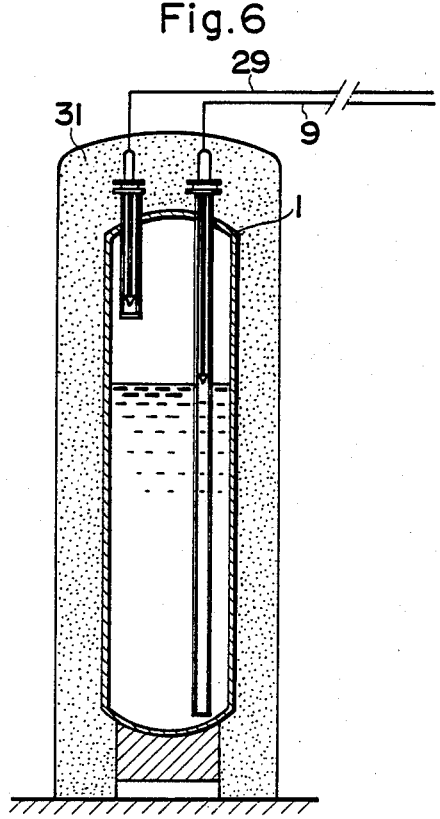
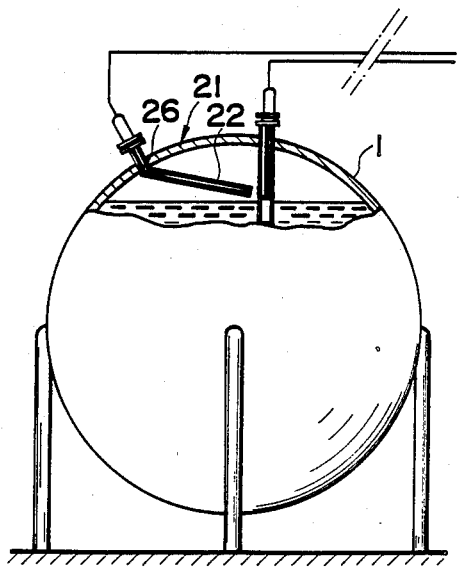

LIQUID LEVEL INDICATOR USING LASER BEAM

BACKGROUND OF THE INVENTION

1. Field of the Invention

The present invention relates to a liquid level indicator suitable for use in high pressure liquefied gas tanks, and more specifically to a liquid level indicator using a laser beam applicable to high pressure liquefied gas tanks such as liquefied petroleum gas tanks, liquefied chlorine gas tanks, liquefied ammonia tanks, liquefied nitrogen gas tanks, etc.

2. Description of the Prior Art

As a prior-art liquid level indicator for detecting a liquid level in an airtightly closed liquid vessel, there exists an indicator in which two pressure-proof glass plates with two opposing slits are fixed to the outside of a vessel and fastened together by flanges, the interior of the slits being in communication with the inside of the vessel so that the liquid level can be detected by visual inspection of the liquid in the slits. In the prior-art liquid level indicator of this type, however, there exists a problem that this indicator is not available for a combustible liquefied gas vessel such as liquefied petroleum gas tank, because the glass indicator is fragile.

On the other hand, there is known another prior-art liquid level indicator in which a float is floated on a liquid level within a vessel with a rope connected to the float being guided via a wheel to a weight hanging at the outside of the vessel in balance each other so that the float position can be detected visually from the outside of the vessel by the position of the weight. In this method, however, there exists a problem that it is difficult to well balance the two due to the rope resistance produced when the rope is guided through a sealing aperture formed in the vessel. Further, it is difficult to manufacture a level indicator of this type at low cost, when an internal pressure is applied to the vessel.

Further, there exits another prior-art method of detecting a liquid level by measuring electrostatic capacitance formed between two electrode plates the first located at the upper portion of a vessel the second floated on a liquid level. However, in case of combustible liquid, the electric devices should be constructed in a explosion-proof type, thus resulting in a higher cost.

On the other hand, recently optical technology using an optical fiber has progressed markedly and also a shutter which can pass a light pulse as short as several to several tens of nanoseconds ($10^{-9}$ sec.) has been developed. Furthermore, it has recently become possible to measure time by an order of $10^{-9}$ sec. Therefore, it has become possible to accurately measure a short distance by a light wave distance-measuring means which has been so far used to measure a long distance of several kilometers or more.

SUMMARY OF THE DISCLOSURE

With these problems in mind, therefore, it is a primary object of the present invention to provide a novel liquid level indicator using a laser beam, which is applicable also to a high pressure liquefied gas vessel.

In view of the above-mentioned fact, the same applicant has already filed a basic liquid level indicator based upon the optical technology in Japanese Patent Application No. 62-137506. In this optical liquid level indicator, a laser beam pulse generated by a light wave distance measuring means is guided to a liquid level surface via an optical fiber, and a reflected laser beam pulse is reflected by a cube mirror disposed on a float floating on the liquid level surface and returned to the same distance measuring means. By measuring a distance between the distance measuring means and the liquid level, a height of the liquid level may be determined.

The above-mentioned optical liquid level indicator has a number of advantages as follows: (1) since there exists neither a fragile portion such as glass parts nor movable parts causing abrasion, the maintenance is easy and the life time is long; (2) since there exists no electrical parts, no protection against explosion is necessary and therefore the manufacturing cost is low; (3) since the liquid-level indicator display units can be concentrated at an appropriate position remote from tanks, it is possible to provide a centralized control of many tanks in a measurement room; (4) the indicator can be used for a tank buried underground; (5) since the optical fiber is small in diameter and no sliding part exists, the fiber can easily be sealed at an opening through which the fiber is guided, and therefore the optical indicator can be used most preferably for high pressure vessel including combustible gas.

In the above-mentioned optical indicator, however, there still exists a problem as follows: when inner pressure within the vessel :s at or near the atmospheric pressure, this liquid level indicator operates accurately. However, as the pressure within the vessel increases to a high pressure, an error is produced whenever the liquid level is measured.

Accordingly, it is a specific object of the present invention to provide a novel liquid level indicator using a laser beam, which can measure the precise liquid level irrespective of the internal pressure change.

The inventors have studied the reason why error is produced in the liquid level indicator using a laser beam and found that as the (gas) pressure within the vessel increases, the index of refraction of the gas for a laser beam increases so that the laser beam travel speed decreases.

According to a first aspect of the present invention, to achieve the above-mentioned object, there is provided an optical liquid level indicator, comprising:

(a) a laser generator for generating a laser beam pulse;

(b) a first optical guide means for guiding the laser beam;

(c) a second optical guide means for guiding the laser beam;

(d) light beam change-over switch means, connected between said laser generator and said two first and second optical guide means, for selectively guide the laser beam pulse generated by said laser generator through one of said two optical guide means;

(e) a float provided with reflecting means for reflecting incident laser beam in parallel thereto disposed within a pressure vessel floating on a liquid level;

(f) a first lens system associated with said first optical guide means, for guiding the laser beam pulse to and from said float reflecting means;

(g) a reference scale provided with reference reflecting means disposed in an upper space above the liquid level within said vessel;

(h) a second lens system associated with said second optical guide means, for guiding the laser beam pulse to and from said reference reflecting means;

(i) a liquid level indicating section, coupled to said laser generator, for calculating a liquid level on the basis of travel time of the laser beam pulse emitted from said laser generator and reflected from said float reflecting means through said first optical guide means and said first lens system, and for calculating a reference distance on the basis of travel time of the laser beam pulse emitted from said laser generator and reflected from said reference scale reflecting means through said second optical guide means and said second lens system, whereby an error, due to pressure, of the calculated liquid level is corrected on the basis of the calculated reference distance.

The reference scale may comprise a tubular body for securing said reference reflecting means. The reflecting means each may comprise a cube mirror. The optical guide means may comprise optical fiber.

According to a second aspect of the present invention, there is further provided with a liquid level indicator using a laser beam comprising:

(a) a liquid level indicating section having beam change-over switch means, light wave distance measuring means, calculating means, and liquid level display means;

(b) two optical fibers each having a first end connected to said beam change-over switch means and a second end (connection end) connected to an upper portion on an inner side of a high pressure liquefied gas tank;

(c) a first lens system having a focal point at the connection end of one of said optical fibers on the upper portion of the high pressure liquefied gas tank and mounted so as to transmit light beam vertically downward from the focal point;

(d) a cube mirror disposed on the top of a float floating on the liquid level surface of liquid to be measured within the high pressure liquefied gas tank; and (e) a reference scale including:
 (1) a lens system having a focal point at the connection end of the other of said optical fibers on the upper portion of said high pressure liquefied gas tank;
 (2) a sheath tube connected to the high pressure liquefied gas tank with its axis arranged in parallel to a travel direction of light emitted from a focal point of said lens system; and
 (3) a cube mirror mounted within said sheath tube, (f) wherein a measured value by said light wave distance measuring means being corrected by said comparison reference scale.

In the liquid level indicator thus constructed, even when the pressure within a high pressure liquefied gas tank increases and therefore the travel speed of the laser beam passing through the high pressure gaseous phase decreases, it is possible to detect the influence of pressure change within the tank since the optical path length within the comparison reference scale is kept constant and known. Therefore, it is possible to correct the liquid level detected by the light wave distance measuring means on the basis of the detected influence of pressure change, so that liquid level can be measured accurately.

The length of the comparison reference scale must be sufficiently long to a certain extent because the light speed is very high. Therefore, when the height of the high pressure liquefied gas tank is sufficiently large and therefore there exists always a sufficient gaseous phase avobe the liquid level, a straight sheath tube is attached vertically within the gas tank. However, when the height of gaseous phase space is small, a bent sheath tube provided with a deflecting means (mirror, prism or the like) at the bent corner is used to obtain a sufficient optical path length.

Further, when a sufficient resistance to corrosion is required for a very high-pressure liquefied gas tank such as liquefied chlorine tank, it is preferable to use a quartz glass excellent in laser beam transmission, pressure-resistance and corrosion-resistance at the upper portion of the tank through which the optical fiber is passed into the tank.

In the liquid level indicator of the present invention, liquid level within a high pressure liquefied gas tank can be measured by use of the light wave distance measuring means, optical fiber, cube mirror, lens systems etc. in combination and additionally corrected by use of the comparison reference scale. It is possible, therefore, to obtain two following advantages in addition to five afore-mentioned advantages (1) to (5) obtained by the basic optical liquid level indicator mentioned hereinbefore:

(1) It is possible to accurately measure the liquid level within a high pressure liquefied gas tank; and (2) It is possible to accurately measure the liquid level within a high pressure liquefied gas tank covered with heat insulating material, without degrading the heat insulation performance of the tank, thus maintaining a high heat insulation efficiency, because optical guide means such as optical fibers only are passed through the heat insulation material.

BRIEF DESCRIPTION OF THE DRAWINGS

FIGS. 5 to 7 are diagrammatical views showing other embodiments of the liquid level indicator according to the present invention.

DESCRIPTION OF THE PREFERRED EMBODIMENTS

Embodiments of the liquid level indicator according to the present invention will be described hereinbelow with reference to the attached drawings.

Figure 1:
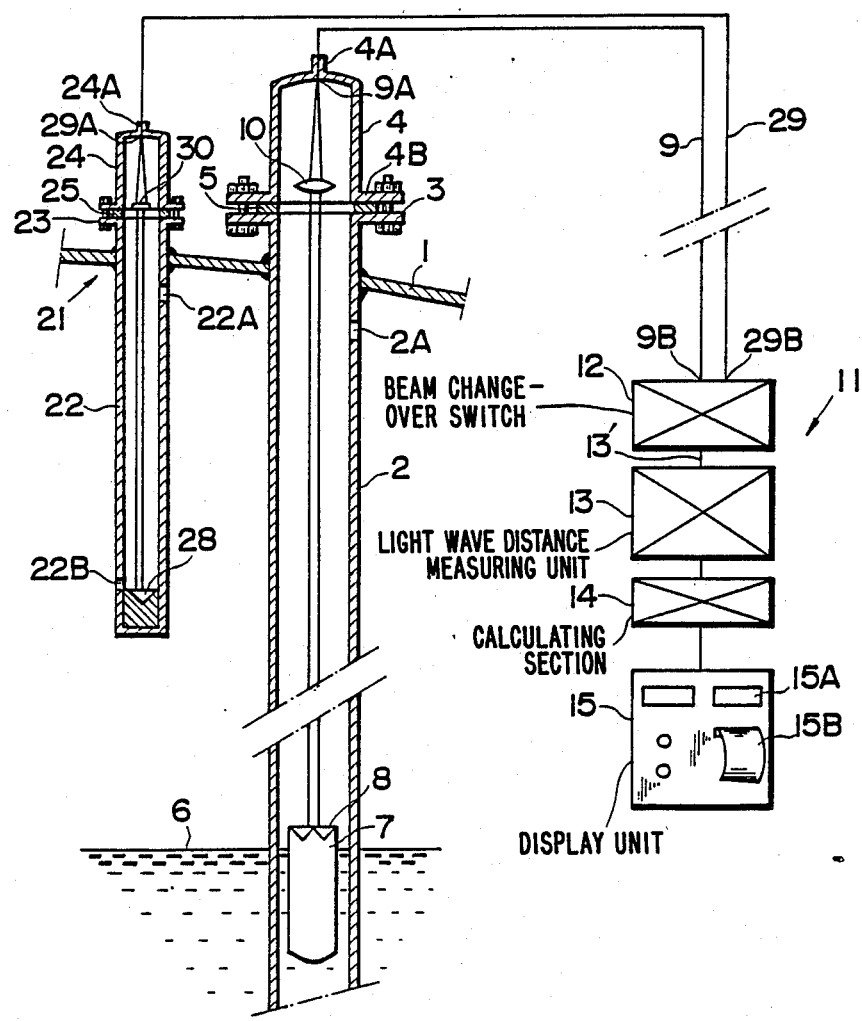
FIG. 1 is a diagrammatical view, including a block diagram of an embodiment of the liquid level indicator using a laser beam according to the present invention.

In FIG. 1, a hollow tube 2 is provided for a high pressure liquefied gas tank 1 in such a way that the liquid level within the tank 1 can freely move therewithin in the vertical direction. The upper portion of the hollow tube 2 is fitted to a hole formed in the tank 1 and fixed thereto by welding, for instance. Further, a vent hole 2A is formed in the side wall of the tube 2 within the tank 1 to introduce the high pressure into the hollow tube 2. On the upper and of this tube 2, there is provided with an upper flange 3 to which a cap 4 with a flange 4B is fixed via a packing 5 with bolts, for instance. A float 7 is floated on the liquid level surface 6 and within the hollow tube 2. A plurality of cube mirrors 8 are attached to the upper surface cf the float 7 to reflect a laser beam.

A small-diameter through hole is formed in a boss 4A provided at the upper portion of the cap 4 to allow an optical fiber 9 to pass therethrough in such a way that one end 9A of the optical fiber 9 is located at the inner wall surface of the cap 4. The optical fiber 9 is comprised of three pieces of fibers. One serves to transmit a laser beam from a light transmit end 9A' thereof; and another one serves to receive a laser beam at a light receive end 9A" thereof (both not shown in the Figure); while the rest is a spare.

A lens system 10 is so positioned within the cap 4 that its focal point is located at the fiber ends 9A. Therefore the laser beam passed through the lens travels in the downward direction as a parallel beam.

Figure 2:
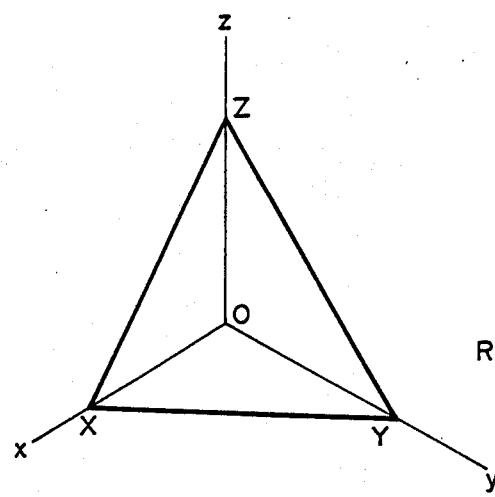
FIGS. 2 and 3 are views for assistance in explaining a cube mirror.
Figure 3:
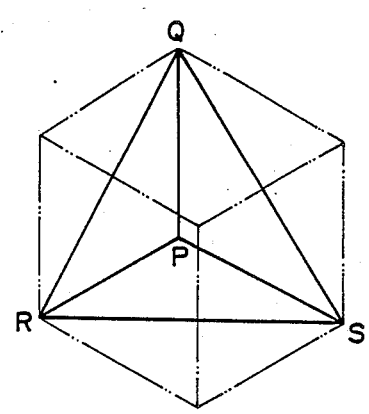

FIGS. 2 and 3 show a cube mirror (reflecting means) 10 in detail. The cube mirror is originally formed by arranging three flat mirrors at right angles with respect to each other. FIG. 2 shows three orthogonal coordinates of x-, y-, and z-axes intersecting at an origin 0. When any given points X, Y and Z are determined on each axis, a cube mirror can be obtained by forming three triangles OXY, OXZ and OYZ as mirrors. In practice, however, since it is difficult to manufacture the cube mirror of this type, a tetrahedron PQRS having one apex P and three adjacent apexes Q, R and S is cut out of a transparent regular hexahedron (i.e., cube) as shown by dot-dot-dashed lines in FIG. 3, and three mirror surfaces are formed on the three triangles PQR, PQS and PRS. The cube mirror manufactured as described above has such a property that the rays incident upon the surface QRS will be reflected back in parallel to the incident rays.

Therefore, the laser beam transmitted from the light transmit end 9A' of the first piece of the optical fiber 9 is returned to the receiving end 9A" of the second fiber piece via the lens system 10, the cube mirror 8, and the lens system 10 due to the optical properties of the lens system 10 and the cube mirror 8.

In FIG. 1 again, a comparison reference scale 21 is provided for the high pressure liquefied gas tank 1 in the vicinity of the hollow tube 2. This reference scale 21 is basically composed of a sheath tube 22, a flange 23 and a cap 24. In the same manner as in the hollow tube 2, the upper portion of the sheath tube 22 is fixed to the tank 1 vertically by welding. A vent hole 22A is formed in the sheath tube 22 within the tank 1, so that high pressure gas can freely enter the tube 22. A drain hole 22B may be provided near the bottom of the tube 22. The flange 23 is formed at the upper end of the sheath tube 22. The cap 24 is fixed to this flange 23 via a packing with bolts.

A small-diameter through hole is formed in a boss 24A provided at the upper portion of the cap 4 to allow an optical fiber 29 to pass therethrough in such a way that one end 29A of the optical fiber 29 is located at the inner wall surface of the cap 24. Like the optical fiber 9, the optical fiber 29 is composed of three pieces of fibers. One serves to transmit a laser beam from a light transmit end 29A" thereof; and another serves to receive a laser beam at a light receive end 29A" thereof (both not shown in the Figure); while the rest is a spare.

A lens system 30 is so positioned within the cap 24 that its focal point is located at the fiber ends 29A. Therefore, the laser beam passed through the lens travels in the downward direction as a parallel beam. Similarly to the case with the float 7, a cube mirror 28 is mounted on the lower end of the sheath tube 22. For the reason as already described, the laser beam transmitted from the light transmit end 29A' of the first piece of the optical fiber 29 is returned to the receiving end 29A" of the second fiber piece via the lens system 30, the cube mirror 28, and the lens system 30 due to the optical properties of the lens system 30 and the cube mirror 28.

A main body 11 of the liquid level indicator comprises a beam change-over switch (fiber switch) 12, a light wave distance measuring unit 13, a calculating section 14, and a liquid level display unit 15. The other ends 9B and 29B of the two optical fibers 9 and 29 are connected to the fiber switch 12 so that any one of the optical fibers 9 and 29 can be selectively connected to the light wave distance measuring unit 13 via the change-over switch 12.

When an extremely short laser pulse is generated from the light wave distance measuring unit 13 under the condition that the end 9B of the optical fiber 9 is connected to the distance measuring unit 13 via the change-over switch 12, the laser beam travels and returns via the distance measuring unit 13, a light transmitting optical fiber 13', the change-over switch 12, the light transmit optical fiber 9, the lens system 10, the cube mirror 8, the lens system 10, the light receive optical fiber 9, the change-over switch 12, the light receiving optical fiber 13', and the distance measuring unit 13.

Therefore, it is possible to measure the total length of the optical path by measuring a travel time of the laser beam because the light velocity is known. In this case, since the distances other than that from the lens system 10 to the cube mirror 8 are all known, it is possible to obtain a distance between the lens system 10 and the cube mirror 8, that is, a height of the liquid level surface relative to the tank 1.

As already explained, however, when the internal pressure of the tank increases, the index of refraction of the gas through which the laser beams pass increases. The travel speed of the laser beam decreases accordingly and therefore an error is produced in measuring operation. In this case, the change-over switch 12 is actuated to connect the end 29B of the optical fiber 29 to the distance measuring unit 13. In the same way, when an extremely short laser pulse is generated from the light wave distance measuring unit 13 under the condition that the end 29B of the optical fiber 29 is connected to the distance measuring unit 13, the laser beam travels and returns via the distance measuring unit 13, the light transmitting optical fiber 13', the fiber switch 12, the light transmitting optical fiber 29, the lens system 30, the cube mirror 28, the lens system 30, the light receiving optical fiber 29, the fiber switch 12, the light receiving optical fiber 13', and the distance measuring unit 13.

In this reference scale 21, all the distances are known and the light travel speed is constant except within the sheath tube 22 filled with a high pressure gas. When the travel time of the laser beam passing there-through is measured, it is possible to know the influence upon the travel speed due to high pressure within the tank. Therefore, it is possible to accurately measure the liquid level height, by correcting the distance value measured by the hollow tube 2 through compensation of the influence upon the light travel speed due to high pressure within the tank by use of the reference scale 21.

The above-mentioned correction or calculation is executed by the calculating section 14 and the calculated results are displayed on a display screen 15A of the display unit 15. Further, when the display unit 15 is provided with a recorder 15B, it is possible to record the calculated results on a recording paper.

The above-mentioned liquid level indicator body 11 combined with the lens system 10 (or 30) is now on the market as a light wave distance measuring apparatus.

Therefore, it is convenient to construct the liquid level indicator of the present invention by reassembling a body 11 and lens systems now commercially available into the liquid level indicator of the present invention. Therefore, more detailed description of the structure and the operation of each section of this indicator is omitted herein.

Figure 4:
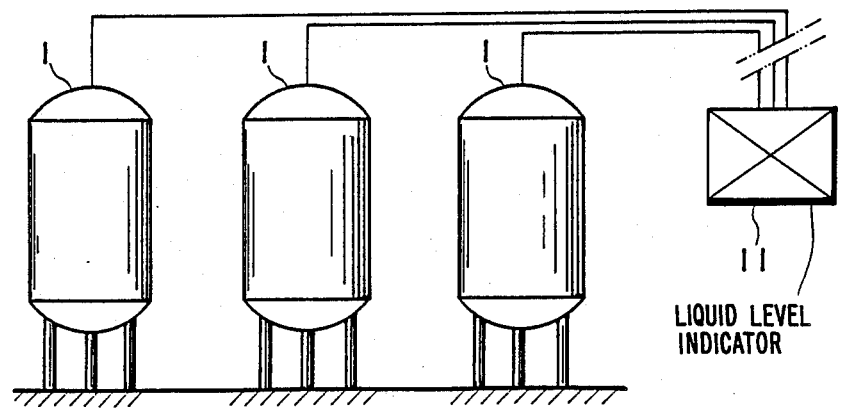
FIG. 4 is an embodiment in which the liquid level indicators according to the present invention are applied to a chemical plant equipped with many tanks.

When the liquid level indicator using laser beam is utilized for high pressure liquefied gas tank, since the optical fiber is small in diameter and flexible, it is possible to install the liquid level indicator body 11 at any given positions. Further, it is possible to get the data from a plurality of the measurement hollow tubes and the reference scales by use of a single liquid level indicator body; therefore, it is possible to control the liquid levels of many high pressure liquefied gas tanks centralized at a control room as shown in FIG. 4.

FIGS. 5 to 7 show other embodiments of the present invention. FIG. 5 shows a horizontal high pressure liquefied gas tank (in which hatching is partially omitted in cross sections). In this embodiment, since the vertical distance over the liquid level is not sufficient for the vertical sheath tube, only a short straight sheath tube 22 may be disposed vertically within the tank. Such case offers a problem that the possible optical path length is excessively short. To overcome this problem, a sheath tube 22 bent at right angles is used and a mirror (deflecting means) 26 is mounted inside the bent corner of the bent sheath tube 22 in order to increase the light travel distance within the gaseous phase by bending the optical path at right angles.

FIG. 6 shows a high pressure liquefied gas tank kept at an extremely low temperature such as liquefied nitrogen gas (in which hatching is partially omitted in cross section). In this embodiment, although the tank 1 is covered by a thick heat insulating material 31, it is possible to mount the indicator on the tank without degrading the heat insulating performance of the tank, as compared with other liquid level indicators since small-diameter fibers can be used to connect the indicator body and the hollow tube or the sheath tube.

FIG. 7 shows a spherical high pressure liquefied gas tank (in which hatching is partially omitted in cross section). Similarly to the embodiment shown in FIG. 5, since the vertical distance over the liquid level is not sufficient for the straight sheath tube, it offers a problem that the possible optical path length is not sufficient when a short straight sheath tube is disposed vertically within the tank. To overcome this problem, a sheath tube 22 bent at an obtuse angle is used and a mirror 26 is mounted at the inside bent corner of the bent sheath tube 22.

The sheath tube is most preferred as a securing means for the reference scale due to its convenience in mounting and availability. However, various modification of the securing means may be done, e.g., shaped steel like an angle or any type of frame structure may be utilized. The securing means is preferably fixed with its one end to the tank for ease in mounting on the tank.

The cube mirror is most preferred as the reflecting means, provided on the float, for reflecting the incident laser beam in a parallel direction to the incident laser beam because the cube mirror can reflect in parallel even when the float swings due to slight waving of the liquid level surface.

Also the sheath tube is most preferred as a guiding means for guiding the float in ascending and descending motion, however, shaped steel or frame structure may be utilized, too.

It should be understood that modifications may be allowed without departing from the gist and concept of the present invention as disclosed and claimed hereinbelow.

What is claimed is:

1. An optical liquid level indicator, comprising:
   (a) a laser generator for generating a laser beam pulse;
   (b) a first optical guide means for guiding the laser beam pulse;
   (c) a second optical guide means for guiding the laser beam pulse;
   (d) light beam change-over switch means, connected between said laser generator and said first and second optical guide means, for selectively guiding the laser beam pulse generated by said laser generator through one of said first and second optical guide means;
   (e) a float provided with a reflecting means for reflecting incident laser beams in a direction parallel to the incident beams, said reflecting means floating on a liquid level within a pressure vessel;
   (f) a first lens system associated with said first optical guide means, for guiding the laser beam pulse to and from said float reflecting means;
   (g) a reference scale provided with reference reflecting means disposed in an upper space above the liquid level within said vessel;
   (h) a second lens system associated with said second optical guide means, for guiding the laser beam pulse to and from said reference reflecting means;
   (i) a liquid level indicating section, coupled to said laser generator: (1) for calculating a liquid level on the basis of travel time of the laser beam pulse emitted from said laser generator and reflected from said float reflecting means through said first optical guide means and said first lens system; (2) for calculating a reference distance on the basis of travel time of the laser beam pulse emitted from said laser generator and reflected from said reference scale reflecting means through said second optical guide means and said second lens system; and (3) for correcting an error, due to pressure, of the calculated liquid level on the basis of the calculated reference distance.

2. The optical liquid level indicator as defined in claim 1, wherein said reference scale comprises a tubular body for securing said reference reflecting means.

3. The optical liquid level indicator as defined in claim 1, wherein said reflecting means each comprise a cube mirror.

4. The optical liquid level indicator as defined in claim 1, wherein said optical guide means comprise optical fibers.

5. A liquid level indicator using a laser beam comprising:
   (a) a liquid level indicating section having beam change-over switch means, light wave distance measuring means, calculating means, and liquid level display means;
   (b) two optical fibers each having a first end connected to said beam change-over switch means and a second end connected to an upper portion on an inner side of a high pressure liquefied gas tank;
   (c) a first lens system having a focal point at the first end of one of said optical fibers on the upper portion of the high pressure liquefied gas tank and mounted so as to receive a laser beam from the focal point and transmit the light beam vertically downward;

(d) a cube mirror disposed on the top of a float floating on the liquid level surface of liquid to be measured within the high pressure liquefied gas tank; and (e) a reference scale including:

(1) a lens system having a focal point at the connection end of the other of said optical fibers on the upper portion of said high pressure liquefied gas tank;

(2) a sheath tube connected to the high pressure liquefied gas tank with its axis arranged in parallel to a travel direction of light emitted from a focal point of said lens system; and (3) a cube mirror mounted within said sheath tube, (f) wherein said calculating means corrects a value measured by said light wave distance measuring means with reference to a value measured through said reference scale.

6. The liquid level indicator using a laser beam as defined in claim 5, wherein said sheath tube is straight and vertically installed in a high pressure liquefied gas tank.

7. The liquid level indicator using a laser beam as defined in claim 5, wherein said sheath tube is a bent tube provided with a deflecting means at a bent portion thereof, said bent tube has a first straight base tube portion perpendicularly fixed to a wall surface of a high pressure liquefied gas tank and a second straight tube portion inclined at an angle with respect to the first straight base tube portion.

* * * * *